(12) United States Patent
Theratil et al.

(10) Patent No.: US 10,844,741 B2
(45) Date of Patent: Nov. 24, 2020

(54) BRUSH SEAL ASSEMBLY AND METHOD (71) Applicant: PRATT & WHITNEY CANADA CORP., Longueuil (CA)

(72) Inventors: Ignatius Theratil, Mississauga (CA); Daniel Coutu, Longueuil (CA); Nicola Houle, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 446 days.

(21) Appl. No.: 15/357,158

(22) Filed: Nov. 21, 2016

(65) Prior Publication Data
US 2018/0142565 A1 May 24, 2018

(51) Int. Cl.
*F01D 25/04* (2006.01)
*F16J 15/3288* (2016.01)
*F04D 29/16* (2006.01)
*F01D 11/00* (2006.01)

(52) U.S. Cl.
CPC ............ *F01D 25/04* (2013.01); *F01D 11/001* (2013.01); *F04D 29/164* (2013.01); *F16J 15/3288* (2013.01); *F05D 2240/56* (2013.01); *F05D 2260/96* (2013.01)

(58) Field of Classification Search
CPC ...... F01D 11/00; F01D 11/001; F01D 11/003; F01D 25/04; F04D 29/164; F05D 2240/56; F05D 2260/96; F16J 15/328; F16J 15/3284; F16J 15/3288
USPC ........................................................ 277/355
See application file for complete search history.

(56) References Cited

U.S. PATENT DOCUMENTS

| | | | | |
|---|---|---|---|---|
| 4,817,455 A | * | 4/1989 | Buxe | F01D 5/027 415/119 |
| 4,848,182 A | * | 7/1989 | Novotny | F01D 5/027 464/180 |
| 5,114,159 A | * | 5/1992 | Baird | F01D 5/10 277/355 |
| 5,181,728 A | * | 1/1993 | Stec | F01D 11/001 277/355 |
| 5,318,309 A | * | 6/1994 | Tseng | F01D 11/02 277/347 |
| 5,335,920 A | * | 8/1994 | Tseng | F16J 15/3288 277/303 |
| 5,351,971 A | * | 10/1994 | Short | F16J 15/3288 277/355 |

(Continued)

FOREIGN PATENT DOCUMENTS

EP 1052438 A2 * 11/2000 ........... F16J 15/3288

*Primary Examiner* — David E Sosnowski
*Assistant Examiner* — Maranatha Boardman
(74) *Attorney, Agent, or Firm* — Norton Rose Fulbright Canada LLP (57) ABSTRACT

A brush seal assembly is adapted to be operatively mounted between a stator and a rotor of a gas turbine engine. The brush seal assembly comprises a housing and a seal operatively coupled to the housing. The seal comprises at least two annular brushes each having a plurality of bristles extending away from the housing. The at least two annular brushes and the housing defines a cavity therebetween. The housing defines at least one circumferential surface within the cavity. The housing comprises at least one discontinuity defined in the at least one circumferential surface. The at least one discontinuity disrupts a continuity of annularity of the circumferential surface.

18 Claims, 10 Drawing Sheets

(56) References Cited

U.S. PATENT DOCUMENTS

| | | | | |
|---|---|---|---|---|
| 5,400,952 A * | 3/1995 | Hetico | ............... | F16J 15/3288 228/177 |
| 5,568,931 A * | 10/1996 | Tseng | ............... | F16J 15/3288 277/355 |
| 5,597,167 A * | 1/1997 | Snyder | ............... | F01D 11/00 277/355 |
| 5,799,952 A * | 9/1998 | Morrison | ............ | F16J 15/3288 277/355 |
| 5,884,918 A * | 3/1999 | Basu | ............... | F16J 15/3288 277/355 |
| 6,173,962 B1 * | 1/2001 | Morrison | ............ | F16J 15/3288 277/355 |
| 6,250,879 B1 * | 6/2001 | Lampes | ............... | F16J 15/3288 277/355 |
| 6,293,554 B1 * | 9/2001 | Dinc | ............... | F16J 15/3288 277/355 |
| 6,308,957 B1 * | 10/2001 | Wright | ............... | F16J 15/006 277/355 |
| 6,382,905 B1 * | 5/2002 | Czachor | ............... | F01D 11/122 415/128 |
| 6,644,668 B1 * | 11/2003 | Albers | ............... | F01D 11/001 277/355 |
| 6,655,692 B2 | 12/2003 | Kono | | |
| 6,739,592 B2 * | 5/2004 | Kono | ............... | F16J 15/3288 277/355 |
| 6,991,235 B2 * | 1/2006 | Ebert | ............... | F01D 11/003 277/355 |
| 7,182,345 B2 * | 2/2007 | Justak | ............... | F01D 11/00 277/355 |
| 7,461,847 B2 * | 12/2008 | Short | ............... | F01D 11/001 277/355 |
| 7,604,241 B2 * | 10/2009 | Kowalczyk | ............ | F01D 11/00 277/355 |
| 7,912,587 B2 * | 3/2011 | Walters | ............... | F01D 5/027 324/154 R |
| 8,328,519 B2 * | 12/2012 | Denis | ............... | F01D 5/027 29/889 |
| 8,382,120 B2 * | 2/2013 | Deo | ............... | F01D 11/02 277/355 |
| 8,690,159 B2 * | 4/2014 | Peer | ............... | F16J 15/3288 277/355 |
| 9,151,170 B2 * | 10/2015 | El-Aini | ............... | F01D 5/10 |
| 9,920,838 B2 * | 3/2018 | Klaen | ............... | F16J 15/3288 |
| 2013/0256992 A1 * | 10/2013 | Zheng | ............... | F16J 15/3288 277/355 |

* cited by examiner

BRUSH SEAL ASSEMBLY AND METHOD

TECHNICAL FIELD

The application relates generally to gas turbine engines and more specifically to brush seals used in such engines for sealing a gap between two parts that move relative to each other.

BACKGROUND OF THE ART

Brush seals are commonly used in gas turbine engine but are typically not intended to function so as to completely seal different engine sections from one another. Brush seals rely on the limited flow path created between bristles of the brush to reduce the air flow from one part of the engine to another to control the pressure drop between the parts.

Such brush seals are for example used in thrust piston used to balance the heavy forces present in gas turbine engines. Compressed air is directed against the thrust piston to counter act the force created by the engine. However, brush seals may help inducing unwanted flutter as a result of pressure difference across the seals.

SUMMARY

In one aspect, there is provided a brush seal assembly adapted to be operatively mounted between a stator and a rotor of a component of a gas turbine engine, the brush seal assembly comprising a housing and a seal operatively coupled to the housing, the seal comprising at least two spaced-apart annular brushes, the at least two annular brushes and the housing defining at least one cavity therebetween, the housing including at least one circumferential surface within the at least one cavity, the at least one circumferential surface having at least one discontinuity extending therefrom and disrupting a continuity of annularity of the at least one circumferential surface.

In another aspect, there is provided a component of a gas turbine engine comprising a stator, a rotor, and a brush seal assembly operatively mounted therebetween, the brush seal assembly comprising a housing and a seal operatively coupled to the housing, the seal comprising at least two annular brushes, the at least two annular brushes and the housing defining at least one cavity therebetween, the housing including at least one circumferential surface within the at least one cavity, the housing comprising at least one discontinuity defined in the at least one circumferential surface, the at least one circumferential surface being axisymmetric other than for the at least one discontinuity.

In a further aspect, there is provided a method for damping flutter of a rotor of a gas turbine engine, comprising: creating a sealing engagement between the rotor and a stator using a housing and at least two annular brushes located between the rotor and the stator, the housing and the at least two annular brushes defining at least one cavity therebetween; permitting a fluid to flow within the at least one cavity, the fluid creating acoustic waves inside the at least one cavity thereby inducing flutter of the rotor when said rotor is in rotation; and disrupting a tangential acoustic mode of the at least one cavity using at least one discontinuity defined in at least one circumferential surface of the housing extending within the at least one cavity thereby attenuating propagation of the acoustic waves inside the at least one cavity.

DESCRIPTION OF THE DRAWINGS

Reference is now made to the accompanying figures in which.

DETAILED DESCRIPTION

Figure 1:
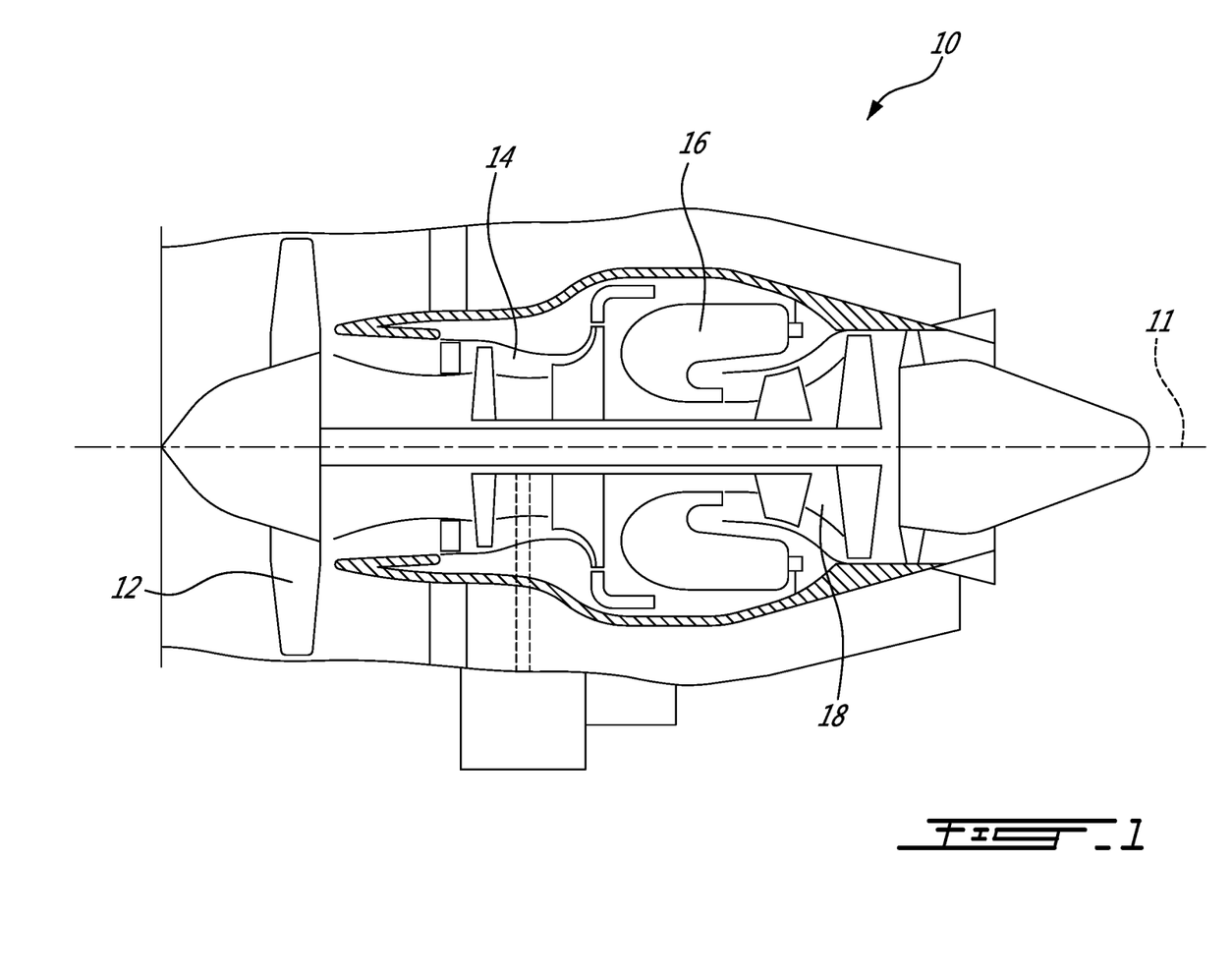
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. Although a turbofan has been depicted in FIG. 1, it is to be understood that the present disclosure may be applied to any kind of gas turbine engines, including but not limited to, turboprops and turboshafts.

Figure 2:
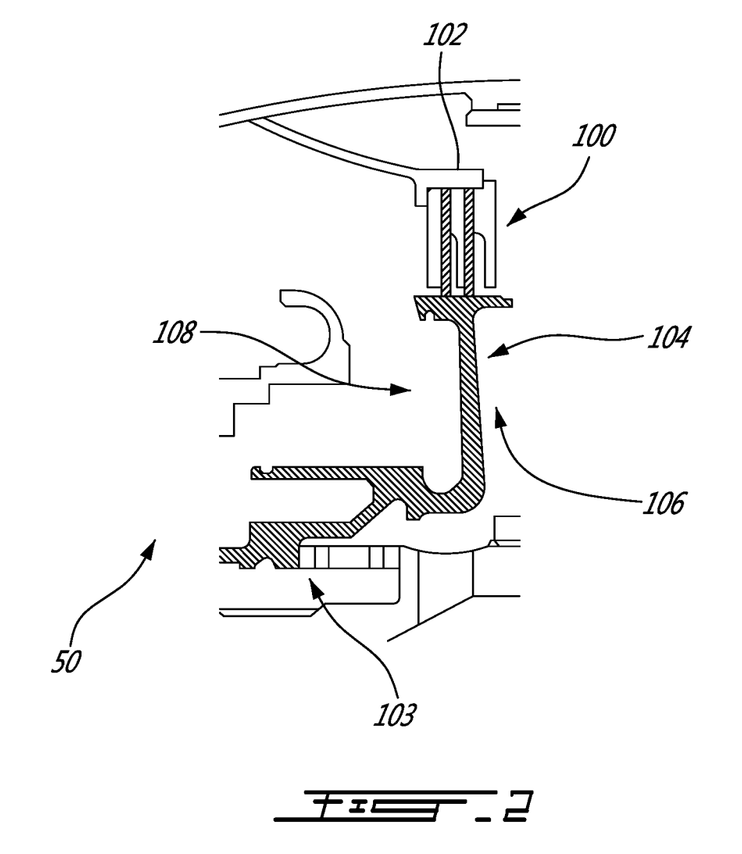
FIG. 2 is a cross-section view of a portion of a gas turbine engine.

FIG. 2 illustrates a cross-section view of the gas turbine engine 10 near the turbine section 18. A brush seal assembly 100 is adapted to be operatively mounted between a stator 102 and a rotor 103 of a gas turbine engine 10. In the present application, the rotor 103 supports a rear seal runner 104, also known as a balance thrust piston. Typically, the brush seal assembly 100 may be used to maintain a generally constant pressure differential between two chambers 106 and 108 axially separated by the rear seal runner 104. The pressure in the chamber 106 is higher than the pressure in the chamber 108 thereby creating a force on the rear seal runner 104 in a direction opposite to the direction of the combustion gases to ensure the ball bearing of the rotor is always loaded axially. According to one embodiment, the rear seal runner 104 may be adapted to push against a carbon seal assembly 50 of the engine 10.

In another embodiment, the brush seal assembly 100 may be mounted between a stator or a rotor of a compressor 14 of the gas turbine engine 10 or any other component comprising a rotor and a stator.

Figure 3A:
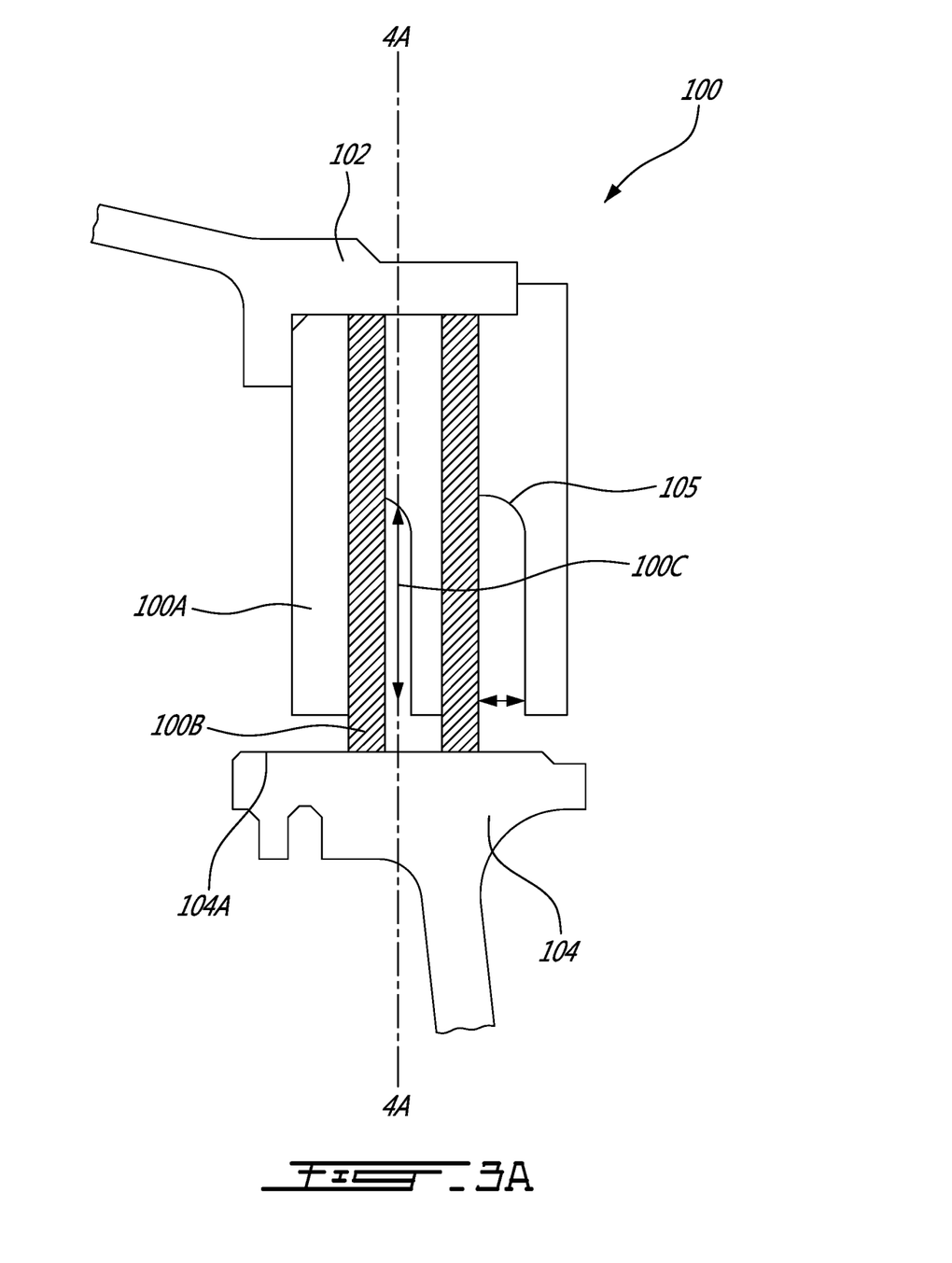
FIG. 3A is an enlarged view of a portion of the cross-section view of FIG. 2 illustrating the brush seal assembly.
Figure 3B:
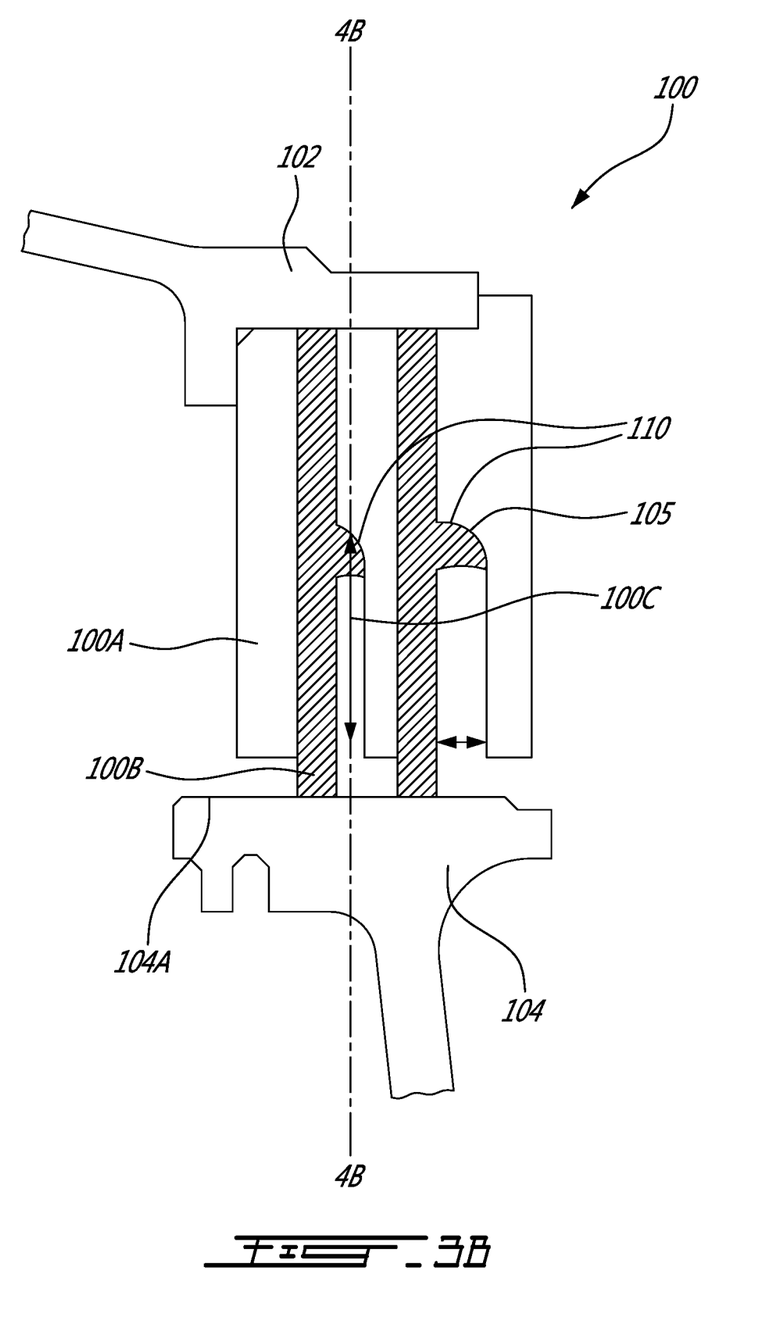
FIGS. 3B and 3C are enlarged views of a portion of the cross-section view of FIG. 2 illustrating the brush seal assembly with the wave disruptors.

FIGS. 3A and 3B illustrate the brush seal assembly 100. The assembly comprises a housing and a seal operatively coupled to the housing. In one embodiment, the seal corresponds to two or more annular brushes 100B each having a plurality of bristles extending away from the housing. The brush seal assembly 100 may be mounted on the stator 102 such that free ends of the plurality of bristles of the annular brushes 100B, engage a sealing surface 104A of the rotor 103 or rear seal runner 104. In one embodiment, the bristles extend radially toward an axis of rotation of the gas turbine engine 10. In an embodiment, the annular brushes 100B may each be generally parallel to a plane to which the axis of rotation is normal. In another supplemental or alternative embodiment, the brush seal assembly 100 is mounted to the rotor 103.

In another embodiment, the bristles may be replaced by equivalent sealing member that provides a degree of permeability to maintain a constant pressure differential between two zones.

In another embodiment, the annular brushes 100B may be part of a stepped brush seal assembly in which the radius of the housing or of the seal varies along an axial direction.

In one embodiment, the housing comprises a plurality of annular spacers 100A axially spaced from each other and adapted to receive the annular brushes 100B therebetween. The annular spacers 100A and the annular brushes 100B may be made of nickel alloys and/or alloys of nickel, chromium, and iron known as INCONEL™. Such a material may be required depending of the operating conditions to which the brush seal assembly 100 is submitted. In one embodiment, the rear seal runner 104 is downstream of the combustor 16. Accordingly, it may be subjected to temperatures neighbouring 600° F. and up to 1200° F. or higher. Any other suitable material may be used provided such material can sustain the operating conditions of a gas turbine engine.

The annular brushes 100B may be embedded within the housing. In one embodiment, each of the annular brushes 100B is axially bound by two annular spacers 100A. The annular spacers 100A may also be referred to as annular washers. In one embodiment, the brush seal assembly 100 comprises a stack of annular spacers 100A and annular brushes 100B disposed in alternation with the annular spacers 100A. Accordingly, more than two annular brushes 100B may be provided by adding more annular spacers 100A. The spacers 100A are thus adapted to sandwich the brushes 100B therebetween according to an embodiment.

In the illustrated embodiment, the brush seal assembly 100 comprises two annular brushes 100B and three annular spacers 100A defining two annular cavities 100C therebetween. Each of the annular cavities 100C is defined between an annular brush 100B and an annular spacer 100A. The annular spacers 100A define at least one circumferential surface 105 within the cavity 100C. In accordance with one embodiment, the surface 105 is axisymmetric other than for discontinuities as explained below.

The annular brush seal assembly 100 may permit a flow of air through it to maintain a substantially constant pressure differential between chambers 106 and 108 upstream and downstream of said annular brush seal assembly. However, the fluid that flows through the annular brushes 100B and within the cavity 100C may induce tangential acoustic waves, with the combined effect of the rotating rotor. In some conditions, the acoustic waves induce flutter of the rotating rear seal runner 104, or other components.

FIG. 3B illustrates an embodiment where at least one discontinuity 110 is defined in the circumferential surface 105. In the present embodiment, the at least one discontinuity 110 is referred to as a wave disruptor disposed within the cavity 100C. The at least one wave disruptor 110 is disposed for disrupting a continuity of annularity of the circumferential surface 105. The circumferential surface 105 is axisymmetric other than for the presence of one or more discontinuity 110. In one embodiment, the discontinuity 110 is a bump protruding at a given circumferential position from the circumferential surface 105. In another embodiment, the discontinuity 110 may be disposed over the circumferential surface 105. Different types of discontinuities 110 may be used in a same annular brush seal assembly.

Figure 4A:
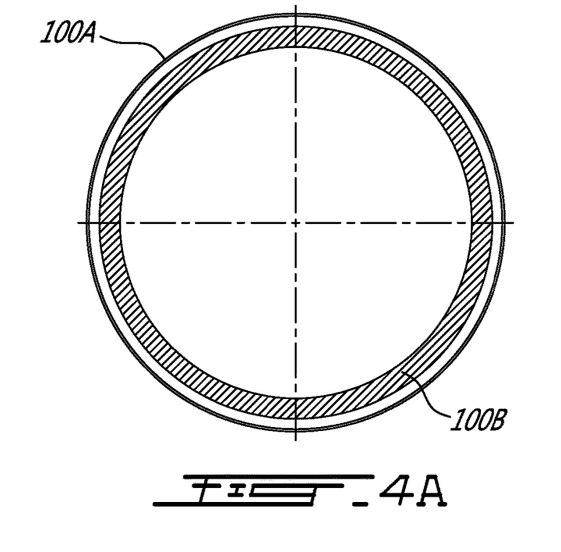
FIG. 4A is a cross-section view of the brush seal assembly of FIG. 3A along line 4A-4A.
Figure 4B:
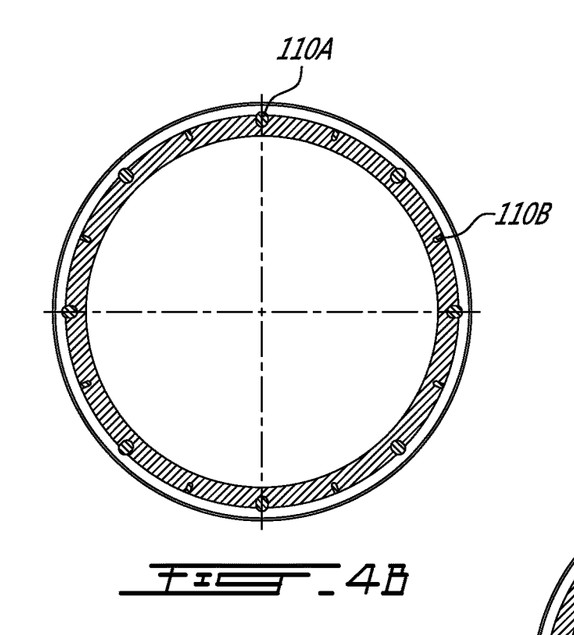
FIG. 4B is a cross-section view of the brush seal assembly of FIG. 3B along line 4B-4B.

FIGS. 4A and 4B illustrate cross-section views along lines 4A-4A and 4B-4B, respectively. In FIG. 4A, the brush seal assembly 100 is free of disruptor. FIG. 4B illustrates an embodiment of the position and size of the plurality of disruptors 110. The configuration illustrated in FIG. 4B, illustrating two types of disruptors 110A and 110B each being circumferentially equidistant from another of its kind, is only one of a plurality of possible embodiments. A different configuration featuring disruptors of different shapes disposed at different positions is contemplated.

Figure 3C:
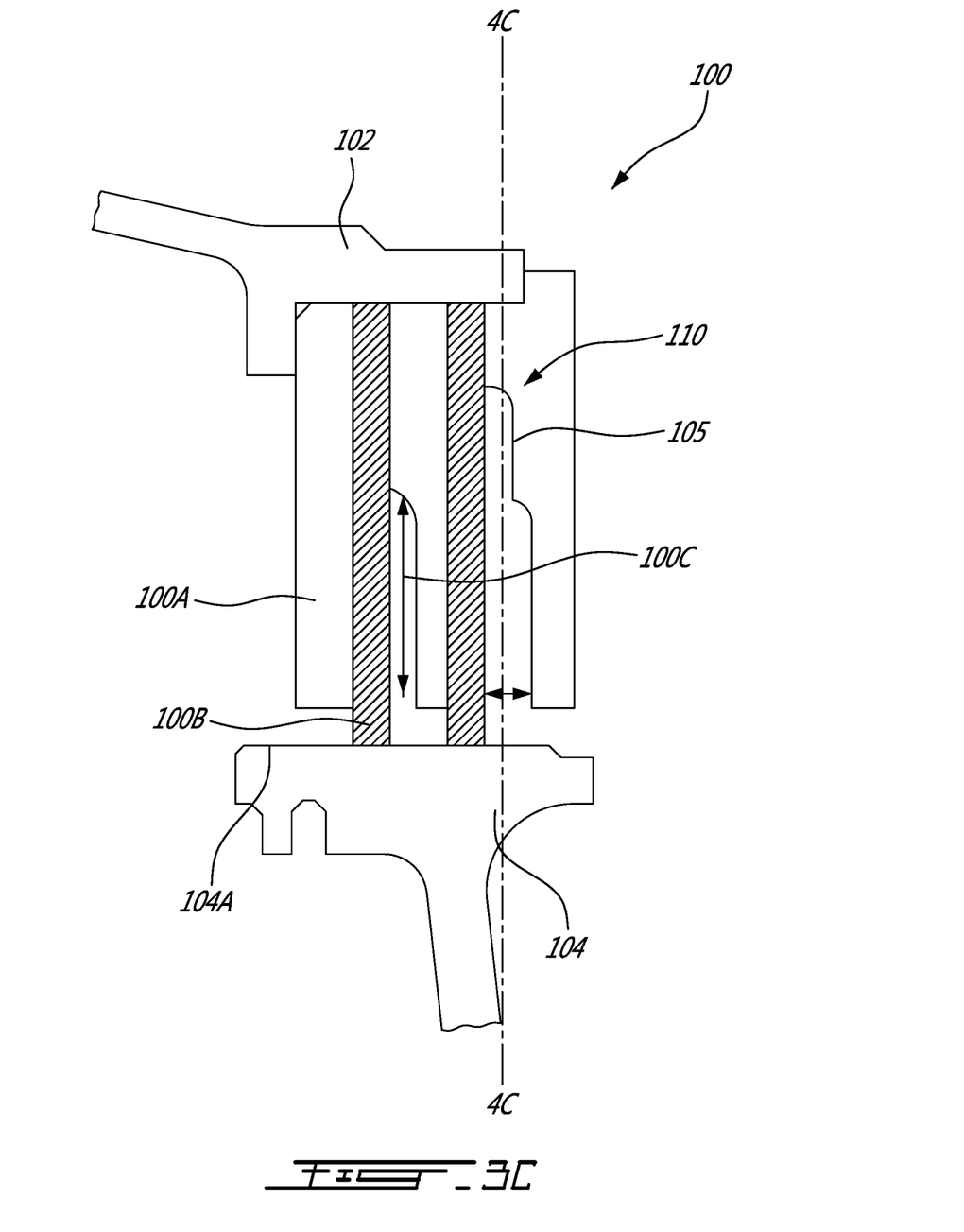
Figure 4C:
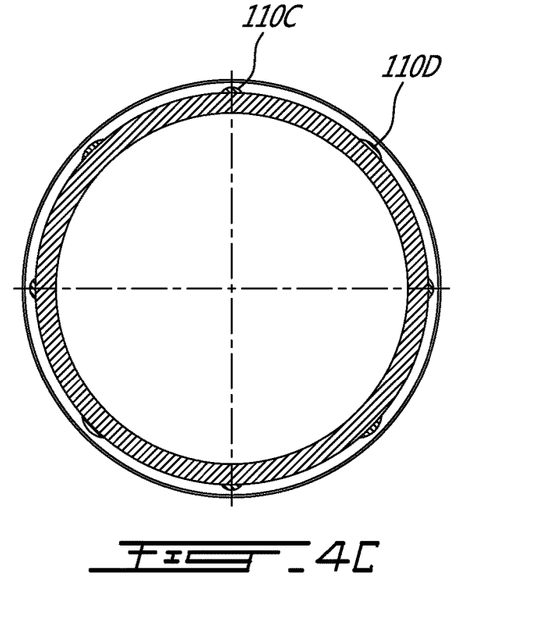
FIG. 4C is a cross-section view of the brush seal assembly of FIG. 3C along line 4C-4C.

FIGS. 3C and 4C illustrate a possible embodiment where the discontinuity is defined by removing matter from the annular spacers 100A. In this case, the wave disruptor would be a cavity 110C or 110D within the at least one annular spacer 100A defined by the circumferential surface 105. A different configuration featuring cavities of different shapes is contemplated.

Although not illustrated in the figures, it would be possible to have a combination of wave disruptor 110A, 110B, 110C, and/or 110D in the same brush seal assembly. Using acoustic analysis, the configuration of the wave disruptors could be optimized to attenuate particularly the acoustic wave pattern, i.e., number of nodal diameter, propagating into the cavity that are the most prone to resonate with the natural modes of the surrounding rotor or stator components. The criteria would be to increase or decrease the cavity volume by up to 20%. These disruptors or features can be evenly or unevenly circumferentially spaced.

The brush seal assembly 100 may be mounted to the stator or to the rotor of the component of the gas turbine engine 10. In one embodiment, a brush seal assembly comprising unevenly circumferentially spaced disruptors is mounted to the stator. In another embodiment, in which the disruptors are evenly circumferentially spaced, the brush seal assembly may be mounted to the stator or to the rotor. More generally, if the inertial center of the brush seal assembly, taken in a plane perpendicular to an axis of rotation of the rotor, corresponds to the axis of rotation of the rotor, the brush seal assembly may be mounted to the rotor or to the stator.

The disruptors 110 may have any shape configured to be inserted inside the cavity 100C. In one embodiment, the disruptors 110 are made from the same material as the housing 100A. The disruptors 110 may be added to existing brush seal assemblies. In another embodiment, the brush seal assemblies may be manufactured with integrated disruptors.

Figure 5:
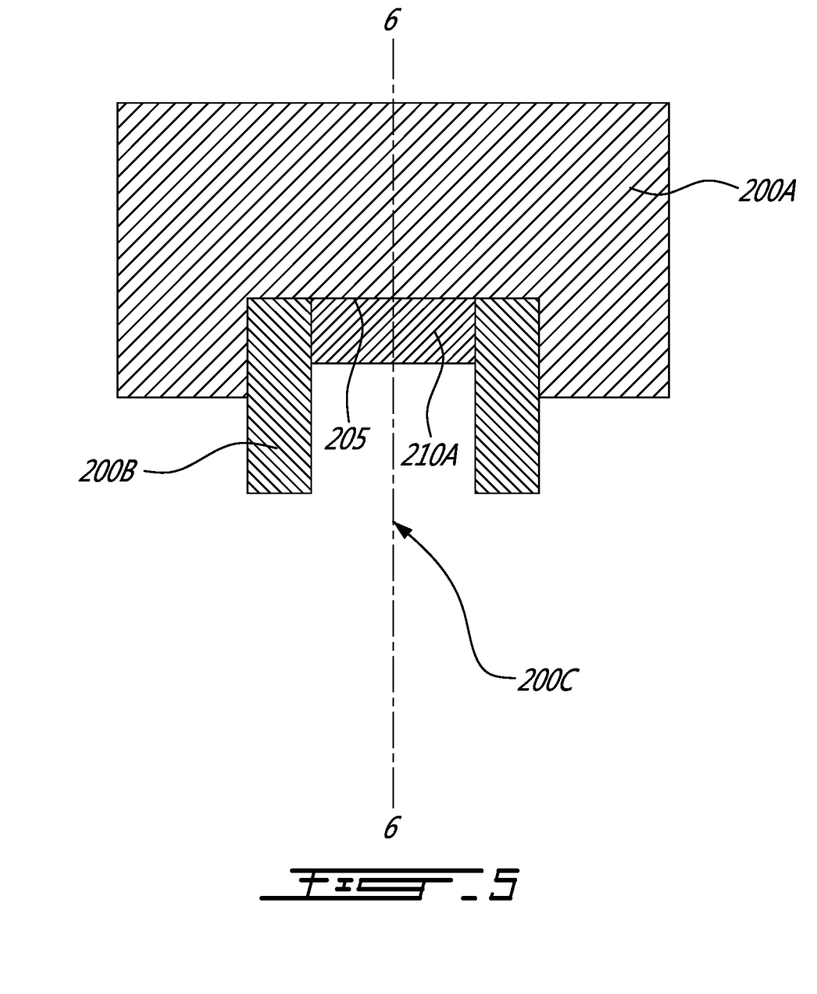
FIG. 5 is a radial cross-sectional view of a schematic brush seal assembly.

FIG. 5 illustrates a more schematic embodiment of a brush seal assembly 200 comprising the housing 200A, the seal 200B, and the cavity 200C. As previously mentioned, the housing 200A and seals 200B may be made of nickel alloys and/or alloys of nickel, chromium, and iron known as INCONEL™, but any other suitable material may be used. In this embodiment, the surface 205 has a substantially cylindrical shape. A discontinuity 210A in the surface, i.e., a wave disruptor, is disposed on the surface 205 within the cavity 200C. The surface 205 is axisymmetric other than for the disruptors 210.

Figure 6:
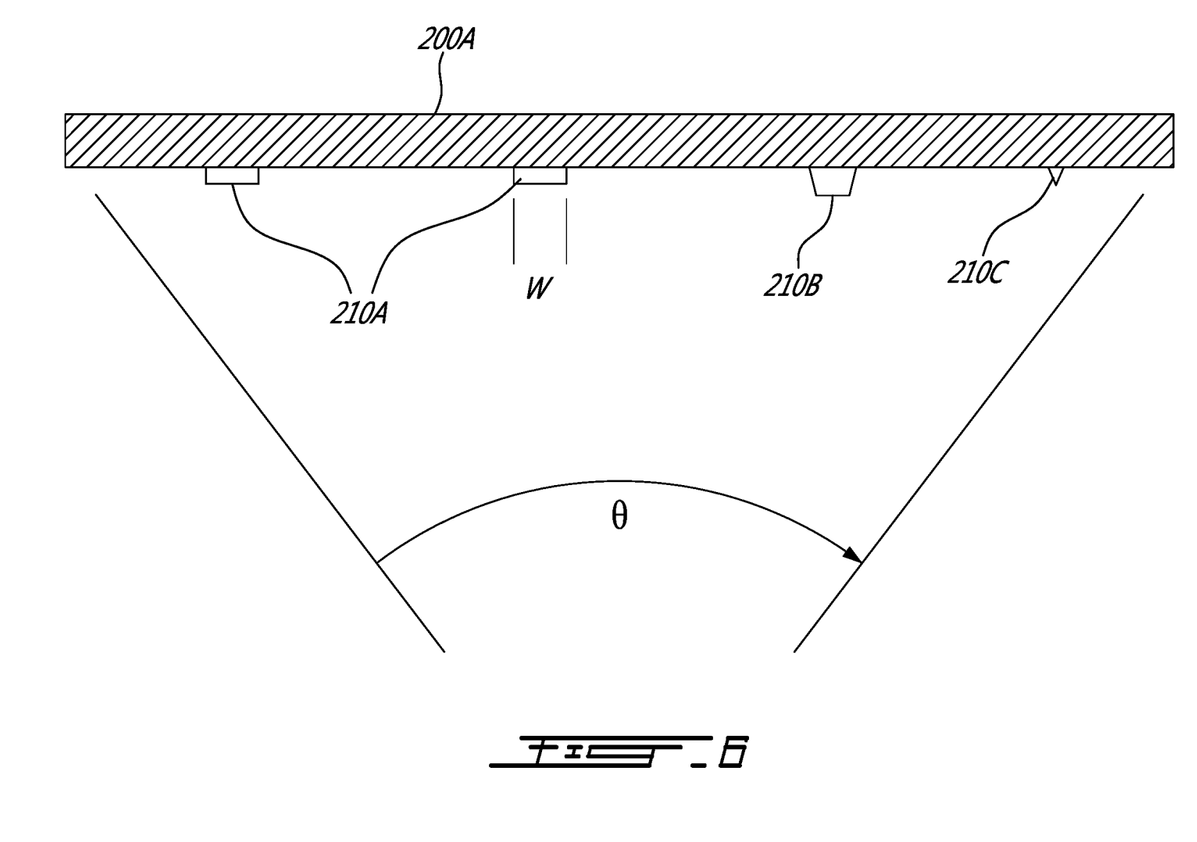
FIG. 6 is an axial cross-sectional view of the schematic brush seal assembly along line 6-6.

FIG. 6 is a cross-section view along line 6-6 of FIG. 5 where a portion of the circumference of the brush seal assembly 200 is illustrated. A plurality of wave disruptors are illustrated. The wave disruptors may have a rectangular shape (210A), a trapezoidal shape (210B), and/or a triangular shape (210C), among numerous possible shapes.

In another embodiment, a discontinuity may be defined in the cavity 200C by removing matter from the housing 200A. In this case, the wave disruptor would be a cavity within the housing 200A and defined by the surface 205.

A method for damping flutter of a rotor, or rear seal runner 104 of a gas turbine engine 10 is also disclosed. The method comprises creating a sealing engagement between the rear seal runner 104 and a stator 102 using a housing, such as but not limited to, annular spacers 100A, and at least two annular brushes 100B located between the rear seal runner 104 and the stator 102. The annular spacers 100A and the at least two annular brushes 100B defining at least one cavity 100C therebetween.

The method also comprises permitting a fluid to flow within the at least one cavity 100C. The fluid thereby creates acoustic waves inside the cavity 100C that induce flutter of the rear seal runner 104 when the runner is in rotation.

The method further comprises disrupting a tangential acoustic mode of the cavity 100C using at least one discontinuity, or wave disruptor 110 defined in at least one circumferential surface 105 of at least one of the annular spacers 100A extending within the cavity 100C thereby attenuating propagation of the acoustic waves inside the cavity 100C. The method comprises increasing or decreasing a volume of the cavity by up to 20%.

In one embodiment, the surface 105 is axisymmetric other than for the at least one wave disruptor 110. The method thus comprises the step of rendering the surface 105 non-axisymmetric by defining at least one wave disruptors 110 on the surface 105.

Figure 7:
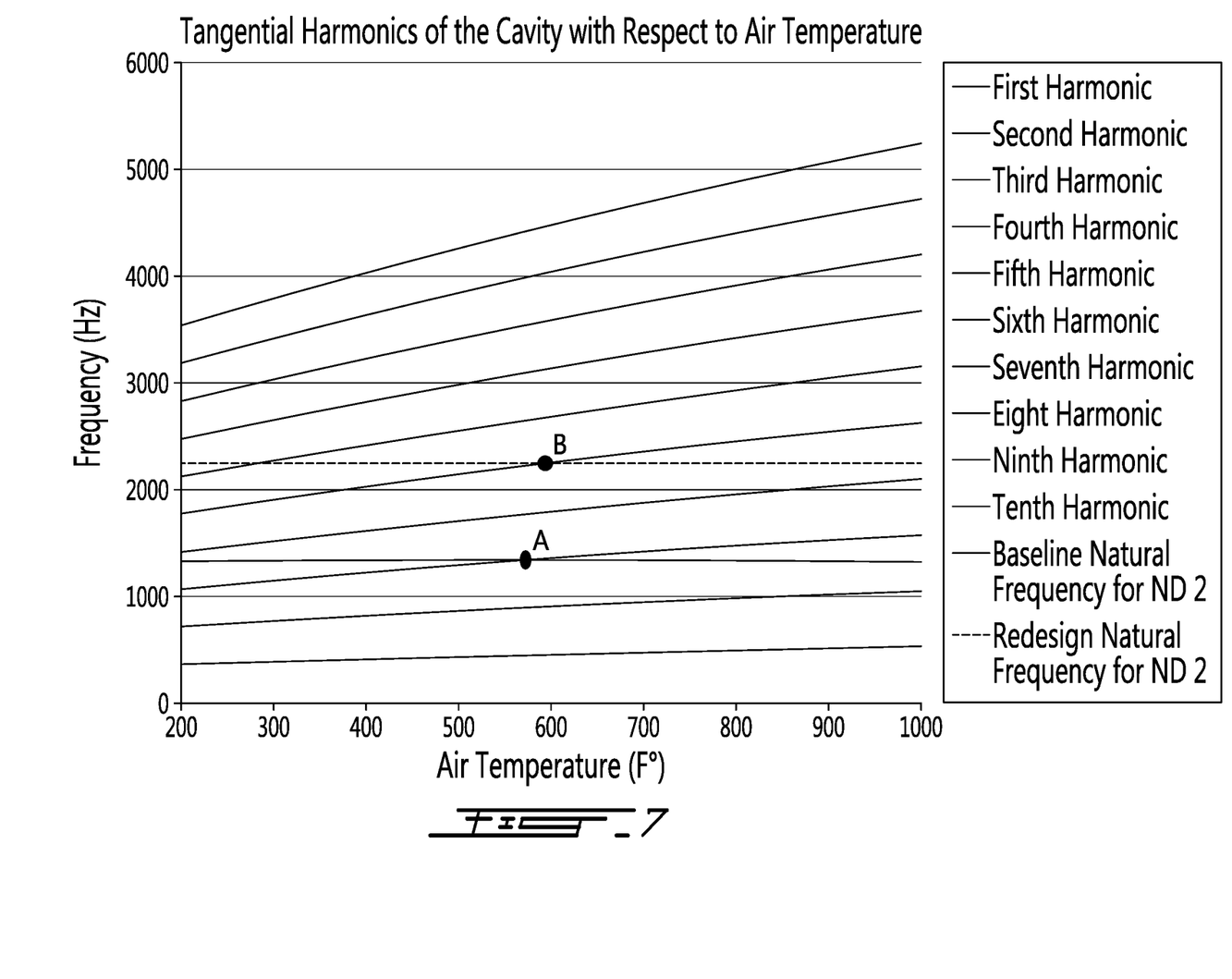
FIG. 7 shows a graph comparing the vibration frequencies of a baseline brush seal assembly versus a treated brush seal assembly.

Now referring to FIG. 7, a graph illustrates a variation of the frequency of the different harmonic modes of the cavity as a function of air temperature. It is possible to notice that the higher the air temperature, the higher the frequency of a given harmonic mode. For example, in an embodiment in which the air temperature is approximately between 560 and 600° F., the circumferential air cavity defined between the two brush seal presents several harmonics of ND type modes. The risk is to have these air cavity modes resonating with the respective backward or forward ND mode of the rotating piston or rotor. Without wave disruptor, the air cavity has a ND2 mode (third harmonic) frequency (point A on the graph) that matches with the backward frequencies of the piston rotor ND2 mode. Also, the fifth harmonic of the ND2 air cavity mode frequency is 2255 Hz (point B on the graph) and can potentially resonate with the forward traveling wave of the ND2 piston rotor. Accordingly, the introduction of wave disruptor is to avoid or limit the possible aero-structural coupling of the ND2 modes (third and fifth harmonics in that example) of the air cavity with the piston rotor forward and backward travelling wave.

The flutter phenomenon could be for different nodal diameters and not necessarily restricted to ND2. The objective is to disrupt the wave generated by the cavity that has potential to synchronize with the forward/backward travelling wave of the rotor. The wave strength can also be attenuated with the presence of features that are evenly or unevenly circumferentially spaced in the cavity.

Figure 8A:
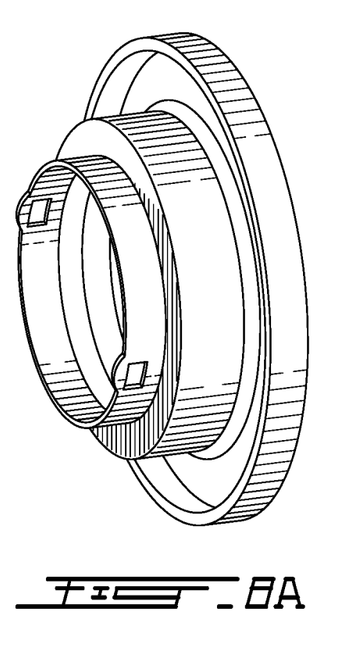
FIGS. 8A and 8B are stress contours of the rear seal runner.
Figure 8B:
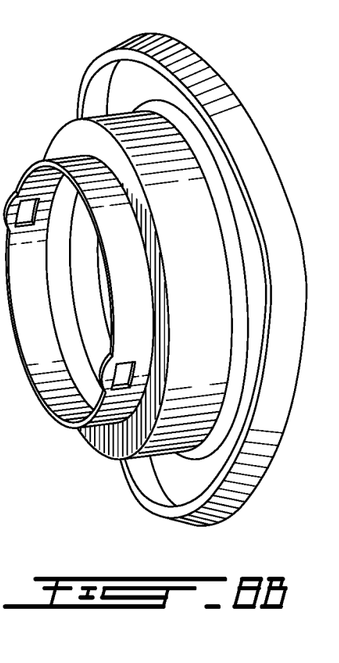

As illustrated on FIGS. 8A and 8B, the ND2 mode is responsible for high peaks of stress and deformation of the rear seal runner 104. The wave disruptors 110 disposed within the cavity created between the two annular brushes 100B may interrupt the respective acoustic waves susceptible to excite the ND2 mode of the rear seal runner 104 and cause a flutter phenomenon.

Although the brush seal assembly has been described and illustrated as being adapted to engage a sealing surface having a substantially cylindrical shape, it is understood that it may also be adapted for engaging a sealing surface having a substantially annular shape. Accordingly, instead of having the bristles of the brush extending radially, they would extend axially away from the housing.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A brush seal assembly adapted to be operatively mounted between a stator and a rotor of a component of a gas turbine engine, the brush seal assembly comprising a housing and a seal operatively coupled to the housing, the seal comprising at least two annular brushes spaced-apart by a spacer of the housing, at least one cavity between the at least two annular brushes, the at least one cavity having an annular cavity portion axially extending from one of the at least two annular brushes to a face defined by the spacer, the spacer defining at least one circumferential surface within the annular cavity portion, the at least one circumferential surface having at least one discontinuity extending therefrom and disrupting a continuity of annularity of the at least one circumferential surface, the at least one circumferential surface being axisymmetric but for the at least one discontinuity.

2. The brush seal assembly of claim 1, wherein the housing comprises at least three annular spacers, the at least two annular brushes being sandwiched between the at least three annular spacers.

3. The brush seal assembly of claim 1, wherein the at least one discontinuity is a bump defined by the at least one circumferential surface and disposed at a given circumferential position.

4. The brush seal assembly of claim 1, comprising a plurality of discontinuities disposed along the at least one circumferential surface, wherein a volume of the plurality of discontinuities is up to 20% of a volume of the at least one cavity without the plurality of discontinuities.

5. The brush seal assembly of claim 4, wherein the housing is configured to be mounted to the stator, an inertial center of the brush seal assembly being offset from an axis of rotation of the rotor.

6. The brush seal assembly of claim 2, wherein the at least three annular spacers and the at least two annular brushes define at least two cavities therebetween.

7. The brush seal assembly of claim 6, wherein the at least two cavities are annular cavities each defined between one of the at least two annular brushes and one of the at least three annular spacers.

8. The brush seal assembly of claim 1, wherein the at least one discontinuity is a hollow portion defined in the housing.

9. A component of a gas turbine engine comprising a stator, a rotor, and a brush seal assembly operatively mounted therebetween, the brush seal assembly comprising a housing and a seal operatively coupled to the housing, the seal comprising at least two annular brushes spaced-apart from one another by a spacer, at least one cavity located between the at least two annular brushes, the at least one cavity having an annular cavity portion axially extending from one of the at least two annular brushes to a face of the spacer, the spacer defining at least one circumferential surface within the annular cavity portion, the at least one cavity extending circumferentially around an axis of rotation of the rotor and being non-axisymmetric, the housing comprising at least one discontinuity defined in the at least one circumferential surface between the at least two annular brushes, the at least one circumferential surface being axisymmetric other than for the at least one discontinuity.

10. The brush seal assembly of claim 9, wherein the housing comprises at least three annular spacers, the at least two annular brushes being sandwiched between the at least three annular spacers.

11. The brush seal assembly of claim 9, wherein the at least one discontinuity is a bump defined by the at least one circumferential surface and disposed at a given circumferential position.

12. The brush seal assembly of claim 9, comprising a plurality of discontinuities disposed along the at least one circumferential surface, wherein a volume of the plurality of discontinuities is up to 20% of a volume of the at least one cavity without the plurality of discontinuities.

13. The brush seal assembly of claim 12, wherein the housing is configured to be mounted to the stator, an inertial center of the brush seal assembly being offset from the axis of rotation of the rotor.

14. The brush seal assembly of claim 10, wherein the at least three annular spacers and the at least two annular brushes define at least two cavities therebetween.

15. The brush seal assembly of claim 14, wherein the at least two cavities are annular cavities each defined between one of the at least two annular brushes and one of the at least three annular spacers.

16. A method for damping flutter of a rotor of a gas turbine engine, comprising:
creating a sealing engagement between the rotor and a stator using a housing and at least two annular brushes located between the rotor and the stator, at least one cavity between the at least two annular brushes, the at least one cavity having an annular cavity portion axially extending from one of the at least two annular brushes to a face defined by the spacer;
permitting a fluid to flow within the at least one cavity, the fluid creating acoustic waves inside the at least one cavity thereby inducing flutter of the rotor when said rotor is in rotation; and
disrupting a tangential acoustic mode of the at least one cavity using at least one discontinuity making the at least one cavity non-axisymmetric, the at least one discontinuity defined in at least one circumferential surface of the spacer and extending within the annular cavity portion thereby attenuating propagation of the acoustic waves inside the at least one cavity.

17. The method of claim 16, wherein the step of disrupting a tangential acoustic mode further comprises decreasing a volume of the at least one cavity by up to 20% using a plurality of discontinuities defined in the at least one circumferential surface.

18. The method of claim 16, wherein the at least one discontinuity is a bump defined by the at least one circumferential surface and disposed at a given circumferential position.

* * * * *